United States Patent [19]

Gulbrandsen et al.

[11] 4,411,871

[45] Oct. 25, 1983

[54] APPARATUS FOR CONVERTING COAL

[75] Inventors: Arthur F. Gulbrandsen, Claremore; Uriel M. Oko, Tulsa, both of Okla.

[73] Assignee: Cities Service Company, Tulsa, Okla.

[21] Appl. No.: 313,044

[22] Filed: Oct. 19, 1981

[51] Int. Cl.³ ............................................. B01J 8/08
[52] U.S. Cl. ................................. 422/232; 48/210; 208/8 R; 208/11 R; 422/240; 585/636
[58] Field of Search ............... 422/232, 233, 240, 307; 208/8 R, 11 R, 106; 48/210; 585/636

[56] References Cited

U.S. PATENT DOCUMENTS

| 2,063,596 | 12/1936 | Feiler | 585/636 X |
| 2,322,857 | 6/1943 | Liedholm et al. | 585/636 |
| 3,960,700 | 6/1976 | Rosen et al. | 208/8 R |
| 3,997,423 | 12/1976 | Greene | 208/8 R |
| 4,191,500 | 3/1980 | Oberg et al. | 422/232 X |
| 4,200,494 | 4/1980 | Welter et al. | 48/210 X |
| 4,206,032 | 6/1980 | Friedman et al. | 48/210 X |
| 4,243,509 | 1/1981 | Sinor | 422/232 X |
| 4,324,637 | 4/1982 | Durai-Swamy | 208/11 R X |
| 4,326,944 | 4/1982 | Meyer et al. | 208/11 R X |

Primary Examiner—Richard L. Chiesa
Attorney, Agent, or Firm—George L. Rushton

[57] ABSTRACT

An apparatus, for the rapid heating and subsequent reaction of carbonaceous material and hydrogen, comprising a cylindrical reactor shell; a first inlet conduit, coaxial with the shell, terminating inside the shell and having the terminal discharge end covered with a metal that resists carbide formation which leads to plugging; a second inlet conduit whose discharge end is in proximity to the discharge end of the first conduit; and suitable insulation means between the first and second conduits.

8 Claims, 2 Drawing Figures

APPARATUS FOR CONVERTING COAL

BACKGROUND OF THE INVENTION

This invention concerns the processing of carbonaceous materials. More particularly, it concerns the conversion of coal into by-products. It further concerns the conversion of caking coal into liquid products. A particular utility of the invention resides in its use in the hydropyrolysis of caking coal to produce desirable liquid products.

In many processes involving the heating of coal, such as hydropyrolysis, a problem frequently encountered concerns the tendency of coal to melt or become plastic over a range of temperature, depending on the type of coal involved. In this temperature range, coal becomes sticky and tends to adhere to various portions of the reactor, such as walls, inlet tubes, etc. In the case of pulverized coal, at this particular temperature range, the particles tend to exhibit a "popcorn effect," at which time the particles swell and lose volatile material. Consequently, each particle has an increase in volume, a loss in density, and a loss in weight. When contacting each other, in the "wet" stage, these particles tend to cluster and agglomerate, adhering due to one or more of the materials being volatilized. Depending on a number of factors, such as the temperature, type of coal, particle velocity, container diameter, etc., sufficient agglomeration may occur to result in plugging of the reactor. In the coal industry, the terms "agglomerating" and "caking" are frequently used interchangeably. We recognize both of these terms, but we prefer "agglomerating" and "nonagglomerating" to separate the types of coal involved. As mentioned above, agglomeration appears to be a gradual phenomenon, depending on the circumstances and conditions.

Several patents exist which show how pulverized agglomerating coal can be injected into a hot reactor. For example, in U.S. Pat. No. 4,200,494, fresh coal particles are introduced into a hot fluidized bed at velocities in excess of 200 ft/sec. The high velocity at which the particles are injected prevents agglomeration because the particles' momentum overcomes the cohesive forces of the sticky material they secrete. The turbulence of the jet forces the sticky particles into "dry" regions of the fluidized bed where the wet particles lose their stickiness.

In U.S. Pat. No. 4,206,032, agglomerating coal is injected into a hot empty reactor as a highly turbulent jet of hot hydrogen gas and coal. Mixing is rapid, such as in a rocket engine. This prevents coal from agglomerating, because the mechanical action of the gas prevents the coal particles from adhering to one another.

SUMMARY OF THE INVENTION

We believe that our invention prevents or greatly reduces the possibility of agglomeration of particles of carbonaceous materials, exemplified by coal, when the materials are fed to a high-pressure, high-temperature reactor, without the necessity of high particle velocity or high turbulence.

Our invention can be used in a process in which carbonaceous materials are heated rapidly, with these materials being introduced by a feed tube or conduit into a high-temperature, high-pressure reactor. In such a process, the feed tube typically has the proximal end at a lower temperature, and the distal end at a higher temperature. The proximal portion of the feed tube has a first metallic composition, such as steel. Our invention concerns the use of a substantial portion of the distal end of the feed tube, this end comprising a material, such as a second metallic composition, that (a) is relatively inert to carbon, (b) resists forming a metal carbide between the metal and the carbonaceous materials, and (c) resists adhesion of cracked carbonaceous residues.

The apparatus for such a process involves a reactor, comprising an enclosed metal shell having a longer axis and a shorter axis, said shell being formed of a suitable material, such as steel. Such a shell can have a plurality of openings at the proximal top on the longitudinal axis and an opening at the distal bottom on the longitudinal axis. In one of the openings at the proximal top, there is a first inlet conduit, extending through the proximal top, with the proximal end of said inlet conduit exterior of the reactor and the distal or discharge end interior of the reactor, with the axis of said first inlet conduit being common with the longitudinal axis of the reactor shell. The distal discharge end of this first inlet conduit has at least an inner covering of a material, such as a metal, that is relatively inert to reaction with carbon, resists forming a carbide with the carbonaceous materials flowing through the inlet conduit, and resists adhesion of cracked carbonaceous materials flowing through the conduit. There is also a second inlet conduit, with its proximal or inlet end exterior of the reactor and a distal or discharge end inside the reactor, the discharge end of the second conduit terminating in proximity to said discharge end of said first inlet conduit. The reactor also comprises insulation, located in the proximal end of the shell, substantially circumscribing said first inlet conduit on the inside of said reactor shell and lodging between the first and second inlet conduits.

In processing carbonaceous materials to form liquid and/or gaseous products, a mixture of the carbonaceous material and hydrogen is introduced into a first stage of a reactor at a temperature below the melting point or softening point of the carbonaceous material, thus allowing the temperature of the mixture to approach the temperature of the reactor. When the pre-heated mixture moves to the second stage of the reactor, meeting a higher temperature, the material is exposed to a temperature above its melting point, and volatiles are produced and agglomeration is possible, except that the stream of particles is now in an environment more spacious than that of the first stage. Thus, the tendency toward agglomeration in the larger space is reduced. For this reason the invention concerns the two-stage heating of the particles—a first pre-heating stage to a temperature below the melting point of the carbonaceous material, and a second stage where the material is heated rapidly to the reactor temperature. At this higher reactor temperature, in the presence of hydrogen, liquid and gaseous products are formed. After a short residence time in the reactor, the products (gaseous, liquid, char) are quenched and removed from the reactor, for further processing.

We have found that such a method and apparatus for converting coal into desirable by-products prevent or markedly reduce the occurrence of agglomeration or the formation of plugs due to agglomeration, especially in the transition zone between the first and second heating stages. Thus there is an increased flexibility in the choice of coals to be processed, and a reduction in maintenance and down-time.

The coal does not have to be injected at temperatures as high as those described in U.S. Pat. Nos. 4,200,494 and 4,206,032. The coal can be introduced into the reactor at the proximal end at any temperature below the coal softening point. The coal can be introduced without jets or other mechanical or pneumatic means of agitation to prevent agglomeration.

There is no need to cool the distal end of the feed conduit to keep the coal from agglomerating. (Water cooling is used in U.S. Pat. No. 4,206,032.)

The apparatus can handle any coal, agglomerating as well as non-agglomerating.

DETAILED DESCRIPTION OF THE INVENTION

Figure 1:
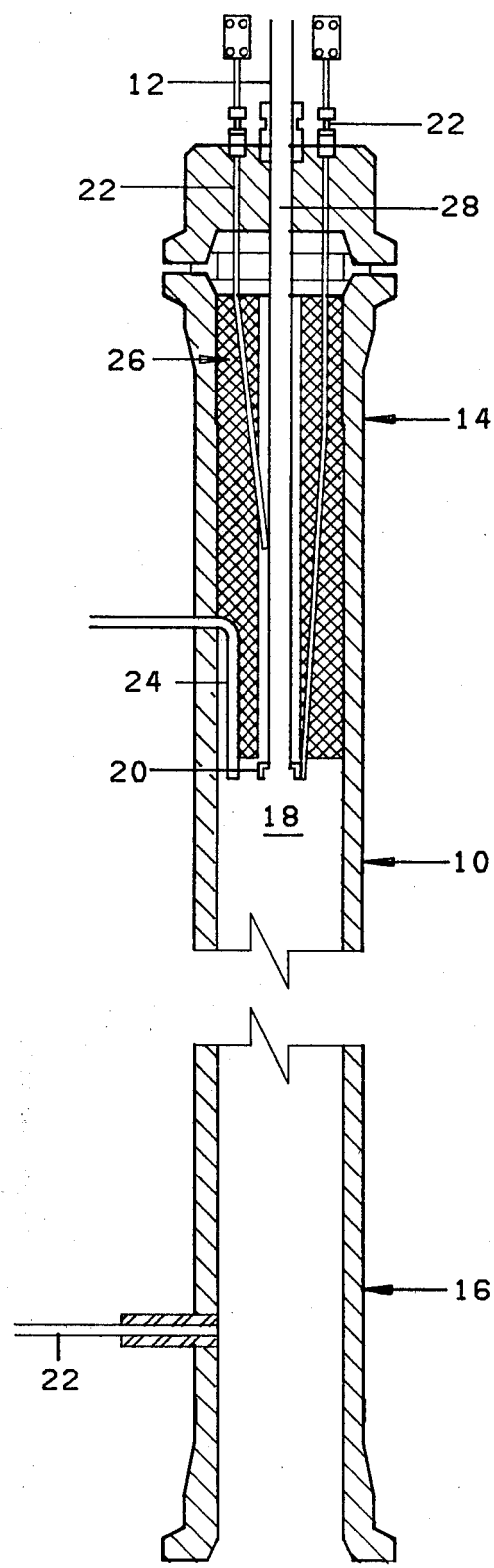
FIG. 1 shows a cross-section view of a typical reactor, showing the inlet conduits, insulation, and one embodiment of the special tip of the coal feed tube. The lower end of the reactor is open, for connecting to downstream processing units.

The invention is concerned with the results obtained during and from the heating of carbonaceous materials. These carbonaceous materials include peat, lignite, coal, solvent refined coal (SRC), petroleum coke, heavy petroleum fractions which are solid at room temperature, wood shavings, tar sands, and oil-bearing shale rock, with the typical material being coal. There are various types of coal, frequently classified as being "caking" or "noncaking," as mentioned earlier. The invention is operable with all these carbonaceous materials.

Representative examples of agglomerating coals are found in Eastern United States, such as West Virginia, Kentucky, Illinois and Pennsylvania. Well-known grades are Pittsburgh seam coal, Illinois No. 6 bituminous coal, and Western Kentucky bituminous coal. These coals tend to agglomerate when heated in the absence of oxygen to temperatures in excess of approximately 900° F. (482° C.) and are thus also known as caking coals. On the other hand, non-agglomerating coals tend to originate in the Western States and are classified as sub-bituminous and lignite coals. These coals do not agglomerate when heated in the absence of air, at any temperature. Some examples of non-agglomerating coals are Montana Rosebud and North Dakota and Texas lignites.

The main chemical differences between these coals lie in their heat content and the oxygen content, which is much higher for the non-agglomerating coals.

TABLE I

| % | Agglomerating (Moisture Free) | | | Non-Agglomerating (Moisture Free) | | |
|---|---|---|---|---|---|---|
| | WKB | IL6 | PI | TL | MRB | NDL |
| C | 70.5 | 65.50 | 68.7 | 61.45 | 64.2 | 63.3 |
| H | 4.7 | 4.49 | 4.9 | 4.24 | 4.7 | 4.3 |
| O (by difference) | 8.8 | 12.34 | 8.1 | 21.86 | 17.8 | 23.1 |
| S | 3.4 | 3.53 | 5.3 | 1.86 | 1.4 | 0.7 |
| ASH | 10.5 | 12.88 | 11.3 | 8.83 | 11.5 | 7.5 |
| Heat Content BTU/lb | 12646 | 12302 | 12628 | 10179 | 11129 | 10440 |

WKB — Western Kentucky bituminous coal No. 9
IL6 — Illinois 6 coal from River King Mine, IL
PI — Pittsburgh seam coal
TL — Texas Lignite from Harrison County
MRB — Montana Rosebud from the Decker Mine, Montana
NDL — North Dakota Lignite, Indian Head Zap Mine, ND The invention is not concerned with the typical combustion of coal, such as in steam generation. The invention is applicable to processes involving the rapid heating of coal, such as in processes involving hydropyrolysis, gasification, and pyrolysis.

As an example of the utility of the invention, pulverized coal of about 100 microns (average particle size) is heated rapidly at a rate in excess of 500° C./second in a reactor, in the presence of hydrogen (averaging about 0.5 lb H/lb coal), to produce desirable by-products, as in U.S. Pat. No. 3,997,423. The particle size of the ground coal can vary from about a U.S. Sieve number of 30 to about 325 (approximately 40 to 600 microns). And the hydrogen/coal weight ratio can vary from about 0.2 to about 10.

As mentioned previously, when coal is heated, it becomes plastic, and various compounds are volatilized from the surface of the particle. Under proper reaction conditions, many of these compounds form radicals, and these radicals react in various ways, as noted below, using toluene as a model compound.

Initiation and Radical Formation

$$C_6H_5CH_3 \rightarrow C_6H_5CH_2\cdot + H\cdot \quad (1)$$

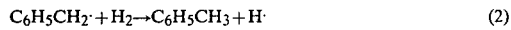

$$C_6H_5CH_2\cdot + H_2 \rightarrow C_6H_5CH_3 + H\cdot \quad (2)$$

Benzene Formation

$$H\cdot + C_6H_5CH_3 \rightarrow C_6H_6 + CH_3\cdot \quad (3)$$

$$C_6H_5\cdot + H_2 \rightarrow C_6H_6 + H\cdot \quad (4)$$

Methane Formation

$$H\cdot + C_6H_5CH_3 \rightarrow C_6H_5\cdot + CH_4 \quad (5)$$

$$CH_3\cdot + H_2 \rightarrow CH_4 + H\cdot \quad (6)$$

Termination

$$2CH_3\cdot \longrightarrow C_2H_6 \quad (7)$$

(no hydrogen)

$$2H\cdot \rightleftharpoons H_2 \quad (8)$$

(with 1000 psi hydrogen)

Typical reaction conditions involve high pressure, to assure good contact, and high temperature, to assure rapid reaction. The presence of hydrogen not only saturates any hydrocarbon radicals produced but also reduces cracking of hydrocarbon chains present. In the absence of hydrogen, it is thought that heavy liquids are produced by the interaction and polymerization of radicals such as those exemplified above.

Polymerization

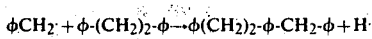

Termination

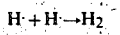

The heavier liquids thus produced offer greater opportunities for stickiness, agglomeration, and possible plugging of the smaller orifices and tubes of a reactor.

The invention has a major object of reducing the agglomerating tendency of the hot carbonaceous particles, thus preventing or markedly reducing the tendency to plug the reactor. When this plugging and agglomeration are prevented or reduced, the desired physical and chemical processes can occur in the reactor.

As shown in FIG. 1, when the pulverized coal enters through an inlet feed tube 12 of a hot reactor, generally illustrated as 10, including a proximal end and a distal end, respectively, generally illustrated as 14 and 16, the coal particles are heated by contact with the wall of feed tube 12. Since the coal particles are moving, there is no lengthy contact time between the tube wall 12 and the particles. Thus, the coal particles are slowly heated until they move into the hotter, open portion 18 of the reactor 10. As long as the particles are kept below the softening temperature, plugging of the distal end 20 of inlet tube 12 is prevented or reduced. Proper reaction conditions inside the hot portion 18 of reactor 10 presume temperature conditions above the temperature at which coal particles become plastic. Reactor 10 also has thermocouples 22 positioned as indicated.

TABLE II

Comparison of Coal Softening Temperatures Using Giesler Plastometer

| Coal | °C. |
| --- | --- |
| Pittsburgh Seam | 364 |
| Western Kentucky | 395 |
| Pocahontas No. 3 | 463 |
| Sewell | 435 |
| Lower Banner | 430 |
| Pond Creek | 405 |
| Illinois #6 | 378 |

[Reference - Lowry H. H., "Chemistry of Coal Utilization" Vol. 1, p. 304; John Wiley 1945, Data by Fieldner, et al, U.S. Bureau of Mines, Tech. Paper 616 (1940)]

The two-stage heating of the coal is important in this process.

With reference to FIG. 1, the major source of heat is the pre-heated hydrogen that is brought into reactor 10 by a second inlet conduit 24. Since the temperature of this hydrogen, such as from about 700° C. to about 1100° C., is much higher than the softening or plastic temperature of the coal particles, it is desirable to keep the hydrogen inlet conduit 24 separated from the coal inlet conduit 12. This can be done, for example as shown in FIG. 1, by having the axis of the first inlet conduit 12 generally concentric with the longer axis of reactor 10, while a portion of the second inlet conduit, or hot hydrogen feed tube 24, inside reactor 10, is placed near and parallel to the inner wall of reactor 10. Insulating material 26 is placed in the proximal end 14 of reactor 10 and surrounds and separates coal feed conduit 12 and hot hydrogen feed conduit 24.

The insulating material 26 can be any of several known insulating materials, such as rock wool or asbestos. The major requirements for the insulating material are that it be stable at the reaction conditions, that it be formable or conformable to the physical aspects of the interior of reactor 10, and that it have a desirable insulating value. It is recognized that within reactor 10, under the operating conditions of temperature, hydrogen flow, coal flow, spacing of the hydrogen tube 24 and coal tube 12, and desired coal temperature at the coal tube outlet 20, there will be a series of temperature gradients between comparable portions of the hydrogen inlet tube 24 and the coal inlet tube 12. Factors involving heat transmission from the hot hydrogen to the inflowing coal can be determined, and calculations can be made so that the proper spacing and amount of insulating material 26 can be determined to give the desired temperature at outlet 20. First-stage heating occurs when the coal/cold hydrogen mixture is warmed by passage through the insulated portion of the reactor 10, such as between proximal end 28 and distal end 20 of tube 12. The coal is heated from ambient conditions to slightly below its melting or softening temperature of about 460° C. (for Pocahontas No. 3—Table II). This proximal portion 28 of the coal feed, or inlet, tube 12 can be formed of any suitable engineering material, such as steel.

It must be noted, however, that the temperature of the distal end 20 of feed tube 12 is higher than the temperature of the coal particles exiting 20 because of heat transfer-time lag which the coal experiences as it reaches the distal end 20. Thus, thermocouple 22 at the distal end 20 will read temperatures (such as 600° C.) which are considerably higher than the softening temperature of the coal. This is summarized in Table III.

TABLE III

| | Operating Conditions | | | Temperatures °C. | |
| --- | --- | --- | --- | --- | --- |
| | Geisler Plastometer Temperatures °C. | | | | |
| Coal | Initial Softening | Fusion | Maximum Fluidity | Distal End* | Reactor |
| Western Kentucky #9 | 308–395 | 339–433 | 417–451 | 594 | 777 |
| Pittsburgh Seam Coal | 333–364 | 395–417 | 417–445 | 594 | 777 |
| Utah Hiawatha (King) | 366 | | 423 | 496 | 705 |

Data on coal from U.S. Bureau of Mines Bulletin 610 "Plastic Agglutenating and Free Swelling Properties of American Coals" by J. G. Walters, W. H. Ode, and L. Spinetti, 1963.
*The temperature of the coal is not the temperature noted by the thermocouple on the distal end of the feed tube, as shown by the fact that the coal is not sticky as it leaves the tube.

Second-stage heating occurs in the region where distal end 20 of coal feed tube 12 opens into the operating portion of reactor 10. It is in this region 18 that the coal, being pre-heated by its journey down the increasingly-heated feed tube 12, is suddenly exposed to a hotter reaction temperature, such as 760° C. (1400° F.). And this is the region in which the coal plasticity point is reached and exceeded. This is the region in which the popcorn effect of the coal particles is noted, where agglomeration takes place, and where the sticky particles tend to adhere to any available surface.

We have found that forming or coating distal end 20 of the coal feed tube 12, with a material that (a) is relatively inert to carbon, (b) resists forming a carbide between the material and the hot carbonaceous material, and (c) resists adhesion of any cracked carbonaceous residues, gives the desirable results in that agglomeration and plugging are prevented or markedly reduced at distal end 20. Distal end 20 of coal feed tube 12 appears critical, since the coal, after it passes this point, is in a much larger volume (hot portion 18 of reactor 10), and the materials volatilized from the coal particles by the higher operating temperature have more free space, and thus the residual coal particles have less tendency to agglomerate.

The coal feed tube 12 and the hydrogen feed tube 24 can be made of typical engineering metals, such as austenitic stainless steel.

Figure 2:
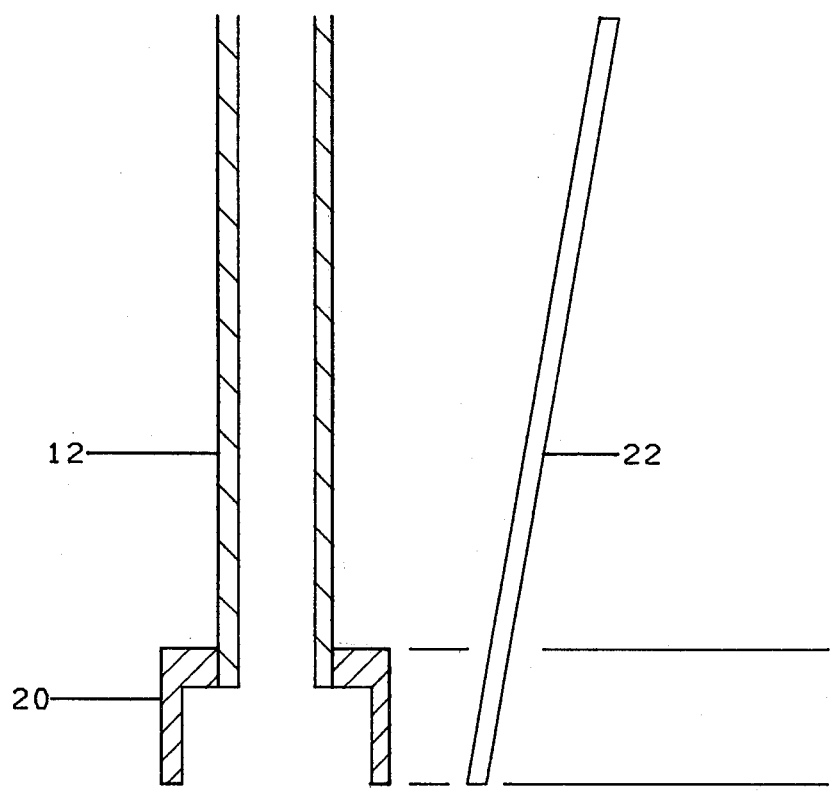
FIG. 2 is a cross-section view of the distal end of the coal feed tube.

FIG. 2 shows more of the detail of one embodiment of this distal end 20, wherein a flange terminates tube 12. We have found that distal end 20 of coal feed tube 12 requires special consideration. Thermocouple 22 is near the distal end of coal feed tube 12. Distal end 20 can comprise a tip, a flange, or a screwable fitting comprising a special metal and attached to feed tube 12. Or, alternatively, the inside of distal end 20 can be coated with a special metal.

The metal used for this special purpose is selected from the group consisting of elements found in groups VIII and Ib of the Periodic Table, wherein those elements have an atomic number greater than 28. Specific members of this group include: Cu, Ag, Au, Ru, Rh, Pd, Os, Ir, and Pt. We have found that copper is quite satisfactory; it is commercially available, and it is less expensive than the other metals. The above metals are relatively inert to carbon and do not form stable carbides. Also, in the tests that have been run, it has been found that a copper tip used on end 20 resists adhesion of cracked residues, since the tip is at a high enough temperature so that there is no cool place for condensation of cracked materials, to form a plug. On the other hand, we have found that a ceramic tip gives unsatisfactory results.

It should be noted that the use of a tip or coating of a particular metal on distal end 20 of coal feed tube 12 is more important when an agglomerating coal is used. The use of a non-agglomerating coal in the process reduces any tendency for agglomeration or stickiness to occur. Therefore, it is recommended that such a tip or covering be used on the end of coal feed tube 12 at all times, to assure the prevention or reduction of agglomeration no matter what type of coal is used in the process.

Typical reaction conditions are similar to those found in U.S. Pat. Nos. 3,960,700 and 3,997,423. The reactor pressure can vary from about 600 to about 3000 psig, while the temperature of the second stage (the hotter portion) can vary from about 500° C. (930° F.) to about 1500° C. (2730° F.).

OPERATING EXAMPLE #1

Western Kentucky bituminous coal was introduced into reactor 10 heated to 777° C. (1430° F.). Distal end 20 temperature was measured at 677° C. (1250° F.). The coal plugged in the tip. When the distal end temperature was reduced to 594° C. (1100° F.), the coal entered reactor 10 without hindrance.

This example indicates the lag in heat transfer time, since the coal moved at a velocity to attain the softening point temperature when the tip temperature was about 677° C. A lowering of the tip temperature to about 594° C. meant that coal was not heated to about 395° C. and thus did not agglomerate.

OPERATING EXAMPLE #2

Western Kentucky bituminous coal was fed into reactor 10 heated to 788° (1450° F.), at a pressure of about 1000 psig and a H/coal wt. ratio of 1.9. Distal end 20 of feed tube 12 was not equipped with a copper tip. Feeder tube 12 soon plugged, from tars which adhered to the tip and char particles which adhered to the tar.

When the same run was repeated with a copper tip at distal end 20 of the feed tube 12, there was no plugging of the feeder tube and the run progressed smoothly.

The product slate, as % C in the coal converted to products, was

BTX (benzene, toluene, xylene—16.6%
light oil—4.0
heavy oil—3.5
$CO+CO_2$—1.8
$C_1$ (methane)—18.3
$C_2$ (ethane)—5.0
$C_3$—0.0

OPERATING EXAMPLE #3

Pittsburgh seam coal was fed into reactor 10 heated to 760° C. (1400° F.), at a pressure of about 1000 psig, with a H/coal wt. ratio of 5.1. The reactor's feed tube 12 was equipped with a copper tip whose temperature was 482° C. (900° F.). No plugging of feeder tube 12 resulted.

The product slate, as % C in the coal converted to products, was

BTX (benzene, toluene, xylene)—15.8%
light oil—0.3
heavy oil—13.0
$CO+CO_2$—0.0
$C_1$—20.8
$C_2$—6.2
$C_3$—2.0

OPERATING EXAMPLE #4

Utah bituminous coal (a mildly agglomerating coal) from the Hiawatha Mine was fed into reactor 10 maintained at 510° C. (950° F.), at a pressure of about 1020 psig, with a H/coal wt. ratio of 2.09. Distal end 20 temperature of feed tube 12 (copper tip) was maintained at 177° C. (350° F.). The coal cleared the tip but agglomerated in reactor 10, because the reactor was maintained at the softening temperature of the coal, and some of the products did not vaporize.

When the same coal was fed into reactor 10 (temperature=705° C. (1300° F.)) with distal end 20 of feed tube 12 maintained at 538° C. (1000° F.), the coal passed through and was adequately treated, since the temperature was sufficient to vaporize the heavier products, thus reducing plugging.

The product slate was
BTX—2.5
light oil—11.3
heavy oil—12.8
$CO+CO_2$—1.4
$C_1$—6.5
$C_2$—5.0
$C_3$—1.8

We claim:

1. A reactor for the rapid heating of carbonaceous materials and hydrogen and the subsequent reaction thereof, comprising:

(a) a generally cylindrical reactor shell including a distal bottom, a proximal top, and a longitudinal axis;

(b) a first inlet conduit extending through the proximal top, and having a longitudinal axis which is common to the longitudinal axis of said reactor and having an inlet end terminating on the outside of said reactor shell and a discharge end terminating on the inside of said reactor shell, said discharge end of said first inlet conduit including a metallic covering that is relatively inert to carbon, resists forming a metal carbide with carbonaceous materials flowing through the first inlet conduit and resists adhesion of cracked carbonaceous materials flowing through the same;

(c) a second inlet conduit having an inlet end terminating on the outside of said reactor shell and a discharge end terminating on the inside of said reactor shell in proximity to said discharge end of said first inlet conduit;

(d) insulation means circumscribing said first inlet conduit on the inside of said reactor shell and lodging between the first inlet conduit and the second inlet conduit such that said insulation extends substantially to the discharge ends of said first and second conduits.

2. The reactor of claim 1 additionally comprising a plurality of thermocouples extending through said proximal end of said reactor shell and conductively communicating with predetermined internal parts of reactor shell.

3. The reactor of claim 2 additionally comprising a thermocouple extending through the side wall of the reactor in the proximity of said distal bottom.

4. The reactor of claim 3 wherein said second inlet conduit is generally L-shaped and inverted with respect to a horizontal plane.

5. The reactor of claim 4 wherein said proximal end of said reactor shell includes a closure means bound to said reactor shell, sealing off the inside of said shell from the atmosphere.

6. The reactor of claim 1 wherein the first inlet conduit is fabricated essentially of steel and the discharge end of said conduit includes at least a covering of a metal selected from the elements of groups VIII and Ib of the Periodic Table having an atomic number greater than 28 such that said covering of said discharge end is exposed to the reacting carbonaceous materials.

7. The reactor of claim 6 wherein the metal is copper.

8. The tube of claim 7 wherein the metal of the distal segment is copper.

* * * * *